United States Patent
Walther et al.

(10) Patent No.: US 7,849,552 B2
(45) Date of Patent: Dec. 14, 2010

(54) WIPER DRIVE UNIT ON A SUPPORT FRAME

(75) Inventors: Bernd Walther, Bietigheim-Bissingen (DE); Harald Kapitza, Ludwigsburg (DE); Jürgen Tempel, Baden-Baden (DE); Frank Wondratschek, Suttgart (DE)

(73) Assignee: Valeo Wischersysteme GmbH, Bietigheim-Bissingen (DE)

( * ) Notice: Subject to any disclaimer, the term of this patent is extended or adjusted under 35 U.S.C. 154(b) by 1233 days.

(21) Appl. No.: 10/538,084

(22) PCT Filed: Dec. 10, 2003

(86) PCT No.: PCT/EP03/13998

§ 371 (c)(1),
(2), (4) Date: Nov. 15, 2005

(87) PCT Pub. No.: WO2004/052701

PCT Pub. Date: Jun. 24, 2004

(65) Prior Publication Data

US 2006/0156502 A1 Jul. 20, 2006

(30) Foreign Application Priority Data

Dec. 10, 2002 (DE) .............................. 102 57 552

(51) Int. Cl.
*B60S 1/18* (2006.01)
*B60S 1/24* (2006.01)
*B60S 1/26* (2006.01)

(52) U.S. Cl. ..................... 15/250.31; 15/250.3; 74/42; 74/43; 74/89

(58) Field of Classification Search ................ 15/250.3, 15/250.31, 250.13, 250.27; 74/42, 43, 89
See application file for complete search history.

(56) References Cited

U.S. PATENT DOCUMENTS

| 1,641,392 | A | * | 9/1927 | Lippert .......................... 74/323 |
| 2,313,201 | A | * | 3/1943 | Klein ....................... 15/250.28 |
| 6,044,518 | A | | 4/2000 | Kiso |
| 2003/0131436 | A1 | | 7/2003 | Rapp |

FOREIGN PATENT DOCUMENTS

| DE | 2636419 | * 2/1978 |
| DE | 41 04 632 | 2/1991 |
| DE | 197 44 906 | 4/1998 |
| DE | 100 11 842 | 10/2001 |
| DE | 101 25 988 | 12/2002 |

* cited by examiner

*Primary Examiner*—Gary K Graham
(74) *Attorney, Agent, or Firm*—Jacox, Meckstroth & Jenkins (57) ABSTRACT

The invention relates to a wiper drive comprising a housing, a reversing motor and a gear mechanism connected downstream of the reversing motor, wherein a swaying element for driving at least one wiper arm or a wiper arm rod is provided on the gear mechanism output shaft, and wherein the operating range of the swaying element lies within a pivoting range which is delimited by two mechanical stops, wherein at least one stop is designed such that it can be removed and/or moved in such a way that the swaying element, when the wiper drive is mounted on a support frame, can be moved from a first mounting position, which lies outside the pivoting range, into the pivoting range without being obstructed by the stop. The invention furthermore relates to methods for mounting a wiper drive on a support frame.

7 Claims, 10 Drawing Sheets

WIPER DRIVE UNIT ON A SUPPORT FRAME

The invention relates to a wiper drive comprising a housing, a reversing motor and a gear mechanism connected downstream of the reversing motor, wherein a swaying element for driving at least one wiper arm or a wiper arm rod is provided on the gear mechanism output shaft, and wherein the operating range of the swaying element lies within a pivoting range which is delimited by two mechanical stops.

Reversing motors for use in wiper drives, in particular for windscreen wiper systems of motor vehicles, are characterized in that their direction of rotation can be reversed in a manner corresponding to the wiper blades moving back and forth on a windscreen or rear window. This has the advantage that a rod assembly for driving two wiper arms can be of very small design or that each wiper arm can be operated independently by coupling to a dedicated drive motor and thus there may be no need for a transmission rod assembly.

The reversal of the direction of rotation is achieved by electrical control of the reversing motor. The reversing motor thus drives the downstream gear mechanism and also the swaying element provided on the gear mechanism output shaft, which swaying element in turn is suitable for driving a wiper arm or a wiper arm rod until the wiper arm has reached one of its end positions on a windscreen to be cleaned. In the end position of the wiper arm, the reversing motor is actuated such that its direction of rotation is reversed, so that the wiper arm is driven in the opposite direction until the wiper arm has reached the other end position. The wiper arm is thus moved within its operating range between the end positions of the wiper arm by a suitable control mechanism.

If there is a fault in the control mechanism of the reversing motor, there is the risk that the wiper arm or the wiper arm rod will be moved beyond the limits of the operating range. The wiper arms coupled to the swaying element thus move beyond their wiping range and may cause damage to the vehicle body or to units within the engine compartment. Moreover, the wiper drive itself may also be damaged.

In order to prevent such damage in the event of a fault in the reversing motor control mechanism, it is proposed according to WO 02/22409 A1 that a drive element connected to a motor crank cooperates with stops which prevent any swaying beyond the turning positions of the windscreen wiper. This is a simple and effective measure for preventing damage to the vehicle, to vehicle units or to the wiper drive in the event of faults in the reversing motor control mechanism.

However, it is disadvantageous in the aforementioned prior art that the checking and mounting of the wiper drive is complicated, and reliable operation is not ensured after a long operating time. In order to be able to check that the motor/gear mechanism unit, which is not yet mounted on a support element, is running true, a swaying element is placed on the gear mechanism output shaft. Once the check of the running is complete, the swaying element is removed again from the gear mechanism output shaft and the motor/gear mechanism unit is mounted on a support element which bears the above-mentioned stops for delimiting the pivoting range of the wiper drive. Finally, the swaying element is placed on the gear mechanism output shaft in such a way that the free end of the swaying element can be pivoted between the stops.

Based on this, it is an object of the invention to further develop a wiper drive of the generic type such that the mounting operation is simplified.

According to the invention, this object is achieved in a wiper drive of the type mentioned above in that at least one stop is designed such that it can be removed and/or moved in such a way that the swaying element, when the wiper drive is mounted on a support frame, can be moved from a first mounting position, which lies outside the pivoting range, into the pivoting range without being obstructed by the stop.

Since at least one stop is designed such that it can be removed and/or moved, the swaying element can be moved out of a first mounting position and into the pivoting range when the wiper drive is mounted on a support frame, which support frame is usually fixed to the body. The first mounting position lies outside the pivoting range. The pivoting range is delimited by two mechanical stops, of which at least one stop is nevertheless designed such that it can be removed and/or moved.

During normal operation of the wiper drive, the swaying element moves only within an operating range which lies within the pivoting range delimited by the two mechanical stops. This has the advantage that the swaying element and the stops do not touch one another during normal operation, which would result in the components being subjected to mechanical stress and in undesirable noise being produced. The swaying element strikes the mechanical stops only if the reversing motor control mechanism has a fault, so that the movement of the swaying element is then limited to the pivoting range delimited between the mechanical stops.

According to a first embodiment, at least one stop is arranged on at least one add-on element such that it cannot be removed, wherein the add-on element can be releasably fixed on a component of the wiper drive, in particular on the housing. In this embodiment, therefore, the stop cannot be removed directly from the wiper drive and/or cannot be moved relative thereto; rather, the stop is provided on an add-on element which for its part can be releasably fixed on a component of the wiper drive, and in particular on the housing. This has the advantage firstly that the handling of the stops during mounting thereof is facilitated, and secondly that further functions can be implemented by the add-on element.

Both stops may be provided on one add-on element or else one stop may be provided on each of two add-on elements. When using one add-on element, the number of components is minimized; a saving in terms of material and weight can be made when using two smaller add-on elements.

As already mentioned, further functions can be implemented by an add-on element. Advantageously, at least one add-on element is suitable for exerting a retaining function for a connection between the housing and a support frame. The add-on element therefore serves not only as a support for one or two stops, but also as a fixing element for ensuring a connection between the housing of the wiper drive and a support frame. By integrating the stop and retaining functions in one component, the number of components of the wiper drive can be reduced and the mounting of the wiper drive can be considerably simplified. As a result, particularly cost-effective manufacture is possible.

In one refinement of the invention, the add-on element can be releasably fixed on a component of the wiper drive, in particular on the housing, in various orientations and/or at various positions. This has the advantage that the add-on element or add-on elements can be used in different installation situations which arise for example when a reversing motor assumes different relative positions with respect to the windscreen to be cleaned in different vehicles. The pivoting range can thus be set in a variable manner by the add-on elements which can be releasably fixed on the housing in various orientations and/or at various positions. The same add-on element can then be used in different wiper drives, as a result of which different wiper drives can be represented by the same components.

The add-on element can be fixed on a component of the wiper drive, in particular on the housing, at at least one, preferably at several, fixing points. When using one fixing point, the add-on element can be mounted in a particularly simple and rapid manner. However, in order to be particularly able to deflect forces and moments which may arise when the swaying element strikes a stop, it is advantageous to provide at least two fixing points for the add-on element. The add-on element is thus secured on the housing of the wiper drive such that any displacement of the stop when it is hit by the swaying element is ruled out, so that the stops can reliably delimit the pivoting range of the swaying element.

The add-on element is preferably designed as a shaped part made of sheet metal. In this way, even add-on elements which implement a number of functions at the same time and therefore may have a complex geometry can be manufactured in a very cost-effective manner.

It may be advantageous if the add-on element is non-releasably connected to the support frame. By virtue of this measure, it is possible to save a handling step during mounting of the wiper drive, since the add-on element and the support frame already have a defined relative position with respect to one another. The non-releasable connection may be produced for example by welding, soldering, adhesive bonding or riveting.

According to a second embodiment of the invention, at least one stop is provided as a separate component which can be fixed on a component of the wiper drive, in particular on the housing. As a result, the at least one stop can be designed in a particular simple and stable manner. Existing wiper drives can be equipped or retrofitted particularly easily with the delimitation of the pivoting range according to the invention. If two stops are provided as separate components, the reversing motor can also be used for rotational operation. In this way, there is no need to provide two different motors for wiper drives in the reversing mode and in the rotational mode.

In one refinement of the invention, the at least one stop is provided as a pin. Such a pin has for example an essentially cylindrical shape and can be inserted for example with a press fit into the housing of the wiper drive. The pin may also already be arranged in the housing prior to mounting of the wiper drive on a support frame, and be displaceable relative to the housing. The pin extends essentially perpendicular to the plane in which the swaying element moves. A stop for delimiting the pivoting range of the swaying element can thus be formed using simple means.

According to a third embodiment, the stops cooperate with a stop element which is provided on or in the swaying element such that it can be moved and/or removed. This has the significant advantage that the stops may already be integrated in the housing of the wiper drive and that the swaying element can be brought into its pivoting range without any problems. When the swaying element is located in the pivoting range, the stop element can preferably be placed essentially perpendicular to the plane in which the swaying element moves, so that the stop element can now cooperate with the stops and prevents any movement of the swaying element out of its pivoting range.

The stop element may be designed for example as a pin which is slidably mounted in the swaying element and can be slid from a position in which it does not cooperate with the stops on the wiper drive into a position in which a movement of the swaying element beyond the stops is not possible.

Advantageously, the stops are made in one piece with a component of the wiper drive, in particular with the housing. By way of example, the stops are part of a cast housing so that the additional mounting of stops on the housing is not required. As a result, a mounting step can be saved.

Advantageously, the support frame on which the wiper drive can be mounted is designed as a tubular element. This has the advantage that the position of the wiper drive can be set within a number of degrees of freedom. For example, the wiper drive can be displaced along the length of the tubular element and can also be rotated around the latter, so that an optimal setting of the wiper drive with respect to the support frame or with respect to a windscreen of a vehicle is possible.

Advantageously, the swaying element is non-releasably connected to the gear mechanism output shaft. This prevents the formation of any play between the swaying element and the gear mechanism output shaft during operation of the wiper drive, and thus any play in the movement of the driven wiper arm or wiper arm rod. A non-releasable connection may be formed for example by welding, pressing-on or caulking.

The invention furthermore relates to a method for mounting a wiper drive, in particular a wiper drive according to the invention, on a support frame, wherein the wiper drive comprises a housing, a reversing motor and a gear mechanism connected downstream of the reversing motor, wherein a swaying element for driving at least one wiper arm or a wiper arm rod is provided on the gear mechanism output shaft, and wherein the operating range of the swaying element lies within a pivoting range which is delimited by two mechanical stops, wherein the following mounting steps are carried out:

a) mutual orientation and positioning of housing and support frame, wherein the swaying element assumes a position outside its pivoting range, b) mounting of a first stop on a component of the wiper drive, in particular on the housing, c) fixing of the housing on the support frame, d) pivoting of the swaying element into the pivoting range, and e) mounting of a second stop on a component of the wiper drive, in particular on the housing.

The abovementioned steps may also be carried out in a different order, in particular in the order a), d), b), e) and c) or a), c), d), b) and e). Instead of steps b) and e) of the last-mentioned order of mounting steps, there may be displacement of a stop element which is provided on or in the swaying element such that it can be moved and/or removed.

The individual mounting methods and advantageous refinements and details of the invention can be found in the following description, in which the invention is described and explained in more detail with reference to the examples of embodiments shown in the drawing.

In FIG. 1, a wiper drive as a whole bears the reference 2. The wiper drive has a housing 4 for a reversing motor 6 and a gear mechanism 8 connected downstream of the latter. The gear mechanism 8 is provided with a gear mechanism output shaft 10 which projects out of the housing 4 and at the end of which a swaying element 12 is placed, said swaying element being non-releasably connected to the gear mechanism output shaft 10. The non-releasable connection is configured as a press connection.

Figure 1A:
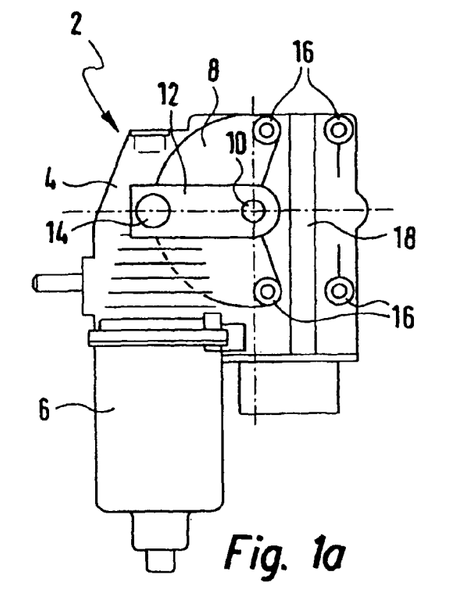
FIGS. 1a-e: show a wiper drive with one add-on element.

Provided at the end of the swaying element 12 remote from the gear mechanism output shaft 10 is a hinge pin 14 which is fixedly connected to the swaying element 12 and serves to drive a wiper arm or a wiper arm rod.

Figure 1B:
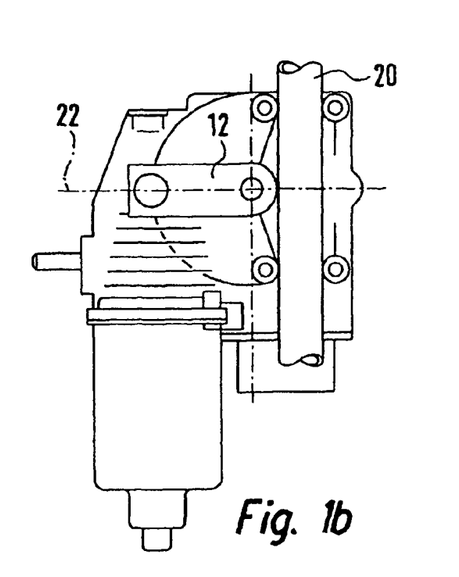

The housing 4 furthermore has a total of four threaded sockets 16 which are arranged in pairs next to an elongate tube receiving area 18. The tube receiving area 18 serves to receive a support frame designed as a tubular element (cf. FIG. 1b). In FIG. 1a, the wiper drive 2 is shown in its state at the start of mounting. In FIG. 1b, the tubular element 20 is additionally shown, said tubular element 20 being placed in the tube receiving area 18 delimited by the threaded sockets 16. The swaying element 12 is shown in a first swaying position 22 in FIG. 1b.

Figure 1C:
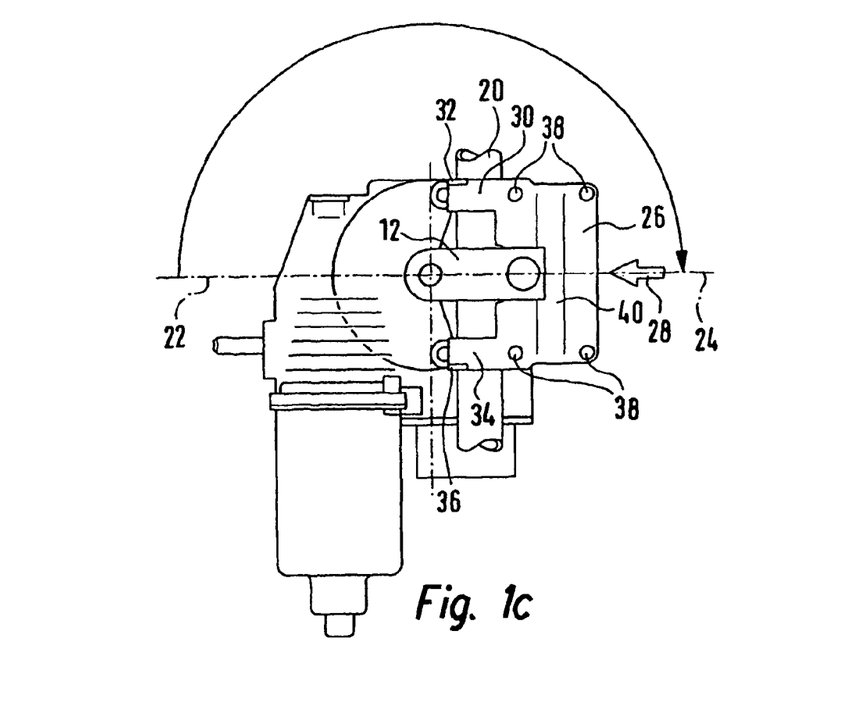

In FIG. 1c, the swaying element 12 is in a position pivoted through 180° from the first swaying position 22 into the swaying position 24. Between the tubular element 20 which is also shown in FIG. 1c and the swaying element 12 which is in the swaying position 24, an add-on element 26 is pushed partially into the intermediate space formed between the tubular element 20 and the swaying element 12, in the push-in direction 28. The add-on element 26 is designed as a shaped part made of sheet metal and has a first stop holding section 30 for a first stop 32 which extends perpendicular to the plane of the drawing. The add-on element 26 furthermore has a second stop holding section 34 for a second stop 36 which likewise extends perpendicular to the plane of the drawing. The add-on element 26 is furthermore provided with a total of four through-holes 38, the arrangement of which corresponds to the arrangement of the threaded sockets 16 shown in FIG. 1a. The through-holes 38 in pairs delimit a tube retaining section 40 which extends parallel to the tubular element 20.

Figure 1D:
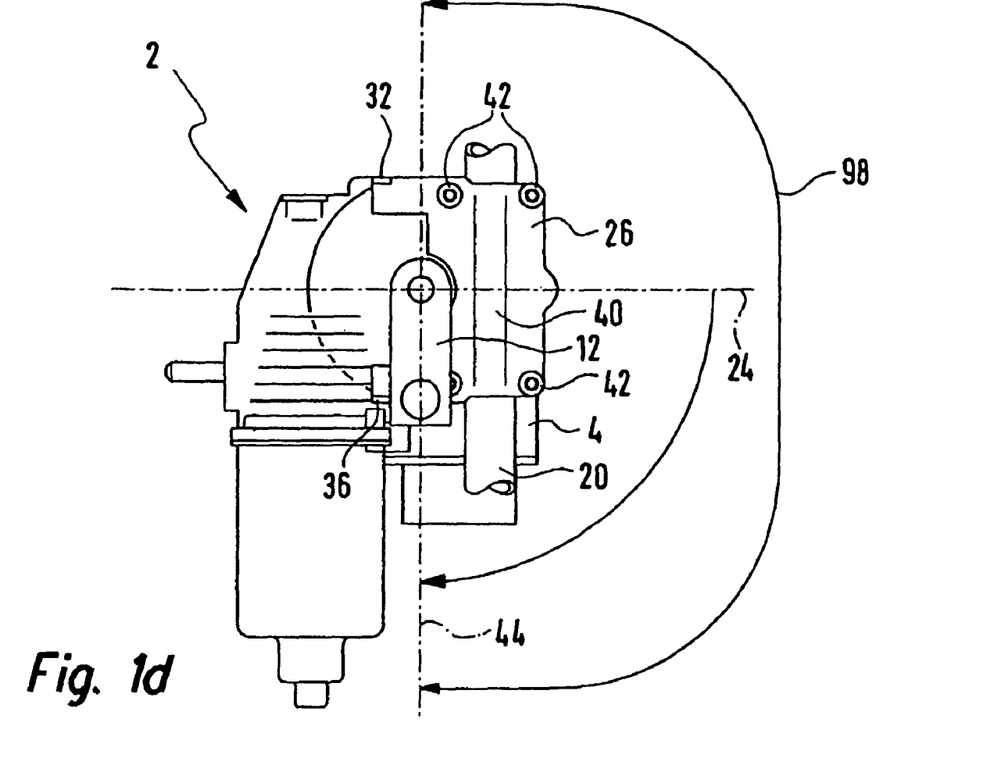

In FIG. 1d, the add-on element 26 is shown in the position which it assumes once mounting of the wiper drive 2 is complete. The add-on element 26 is fixed in the threaded sockets 16 shown in FIG. 1a by screws 42 which pass through the through-holes 38 shown in FIG. 1c. The tubular element 20 is thus secured between the housing 4 and the tube retaining section 40 of the add-on element 26.

The swaying element 12 as shown in FIG. 1d has been pivoted by a further 90° compared to the position 24 shown in FIG. 1c, into a third swaying position 44. In the position shown in FIG. 1d, the swaying element 12 bears against the second stop 36. The stop 36 and the stop 32 delimit a pivoting range 98, within which the swaying element 12 can move. The operating range of the swaying element 12 lies within the pivoting range 98.

Figure 1E:
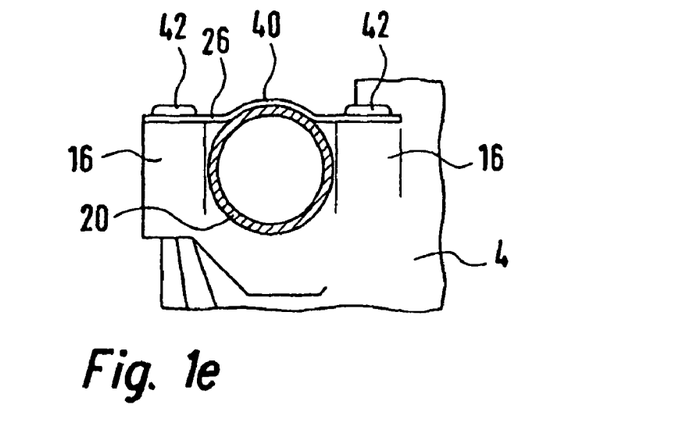

In FIG. 1e, the securing of the tubular element 20 on the wiper drive 2 is shown in detail. The tubular element 20 is received in a space which is delimited towards the bottom by the housing 4 and to the sides by the threaded sockets 16. The tubular element 20 is secured towards the top by the add-on element 26, which bears with its tube retaining section 40 against the tubular element 20, by means of screws 42.

The mounting of the wiper drive 2 shown in FIGS. 1a-1e comprises a total of five mounting steps. Firstly, the tubular element 20 is placed in the tube receiving area 18 of the housing 4 (cf. FIGS. 1a and 1b). In the second step, the swaying element 12 is pivoted from its first position 22 into its second position 24 (FIG. 1c), and in a third step the add-on element 26 is pushed into the intermediate space between the tubular element 20 and the swaying element 12, in the push-in direction 28 (FIG. 1c). In a fourth mounting step, the add-on element 26 is secured on the housing 4, wherein the tubular element 20 is clamped securely (cf. FIGS. 1d and 1e). In a final mounting step, the swaying element 12 is pivoted out of the position 24 shown in FIG. 1c and into the position 44 shown in FIG. 1d.

Figure 2A:
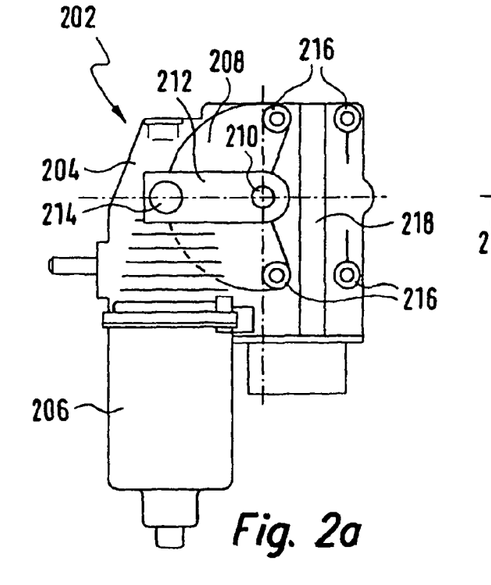
FIGS. 2a-c: show a wiper drive with two add-on elements.
Figure 2B:
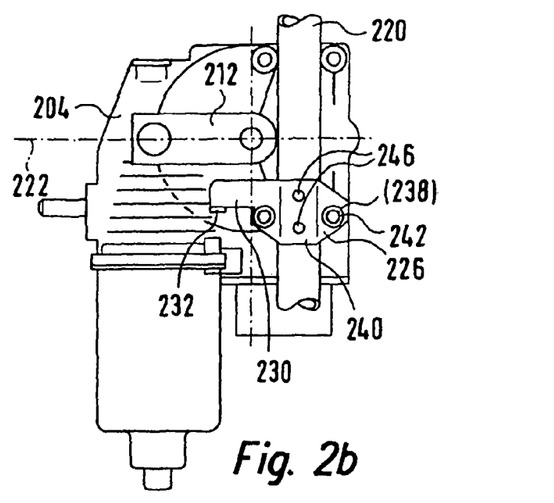

The embodiments described below are based in principle on the original mounting state of the wiper drive 2 as shown in FIG. 1a. The references of FIG. 1a have been retained for the embodiments shown in FIGS. 2 to 7, with the references being increased in steps of 100 for each embodiment. The wiper drive shown in FIG. 2a thus bears the reference 202. All components 204 to 218 which are shown in FIG. 2a correspond to components 4 to 18 shown in FIG. 1a. Thus, in FIG. 2a, a tube receiving area 218 is provided which is delimited by pairs of threaded sockets 216. As shown in FIG. 2b, a tubular element 220 is inserted in the tube receiving area, said tubular element being fixedly connected to an add-on element 226. The add-on element 226 has a stop holding section 230, at the end of which there is a first stop 232 which extends perpendicular to the plane of the drawing. The add-on element 226 has two through-holes 238 which are provided on either side of a tube retaining section 240 and are passed through by screws 242 which are fixed in the threaded sockets 216 shown in FIG. 2a. The add-on element 226 is connected to the tubular element 220 by a welded connection 246 in the form of two spot welds.

Figure 2C:
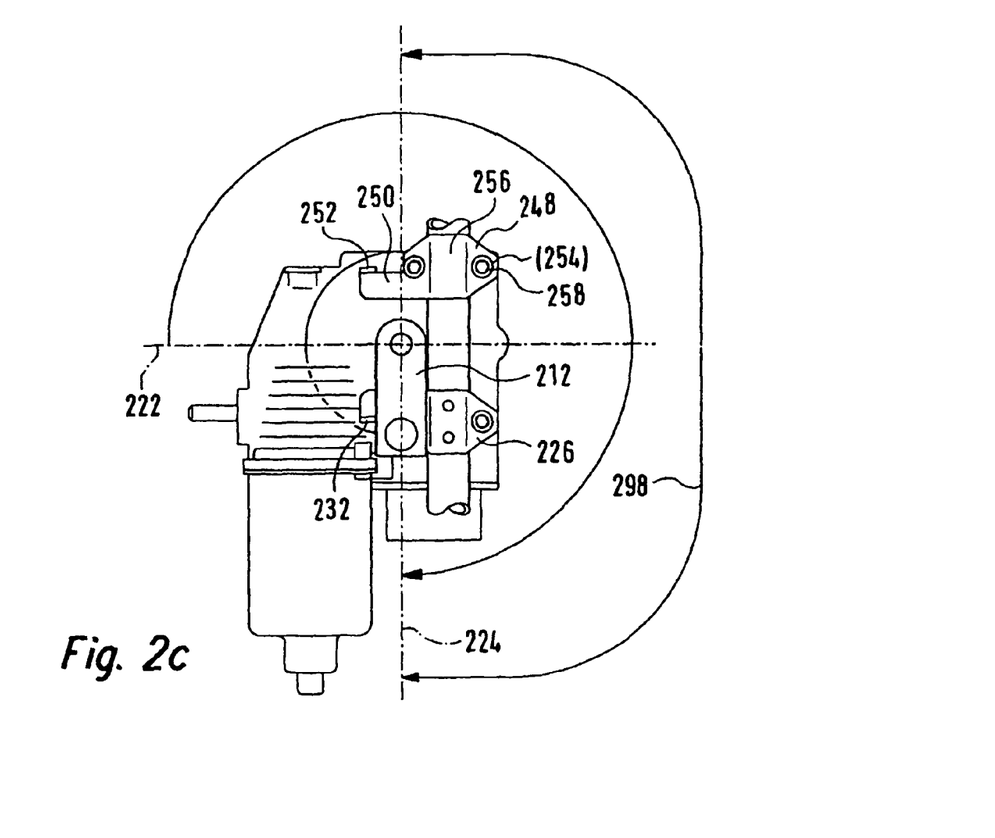

In FIG. 2c, the swaying element 212 has been pivoted by 270° in the clockwise direction compared to the swaying position 222 shown in FIG. 2b, into a second swaying position 224. In this position, the swaying element 212 bears against the stop 232 of the add-on element 226.

There is furthermore a second add-on element 248 which has a stop holding section 250 on which a second stop 252 is arranged. The second stop 252 likewise extends perpendicular to the plane of the drawing.

The second add-on element 248 has two through-holes 254 which are arranged on either side of a tube retaining section 256 and are passed through by screws 258 which are fixed in the threaded sockets 216 shown in FIG. 2a. The stops 232 and 252 delimit a pivoting range 298 which extends essentially over 180°.

The following mounting steps are required in order to mount the wiper drive 202 shown in FIGS. 2a-c. Firstly, the add-on element 226 is fixed on the tubular element 220 by means of the welded connection 246. The tubular element 220 and the add-on element 226 are then supplied as an assembly to the housing 204 of the wiper drive 202, so that the tubular element 220 is received in the tube receiving area 218. In the next step, the add-on element 226 is fixed to the housing 204 of the wiper drive 202 by means of screws 242 (cf. FIG. 2b). In the next step, the swaying element 212 is pivoted by 270°, out of the position 222 shown in FIG. 2b and into the position 224 shown in FIG. 2c, in which the swaying element 212 comes to bear against the stop 232 of the add-on element 226. In the next step, the add-on element 248 is fixed to the housing 204 of the wiper drive 202 by means of the screws 258.

Figure 3A:
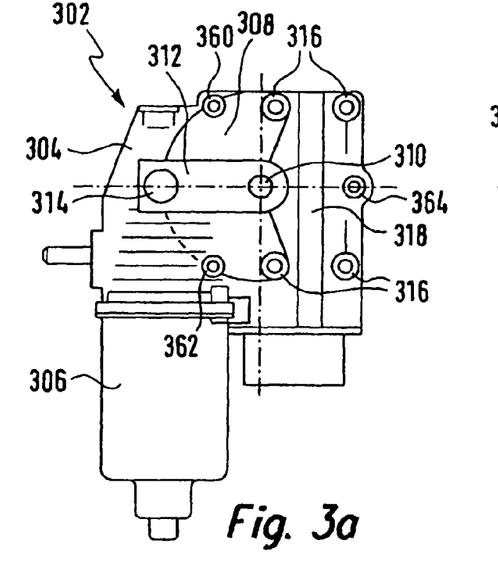
FIGS. 3a-c: show a wiper drive with an add-on element according to a second embodiment.

The wiper drive 302 shown in FIG. 3a corresponds essentially to the wiper drive 2 shown in FIG. 1a. Additionally, a total of three fixing points 360, 362 and 364 are provided on the housing 304. The fixing points 360 to 364 are arranged on a circular path with respect to the gear mechanism output shaft 310 and at a distance of in each case 120°.

Figure 3B:
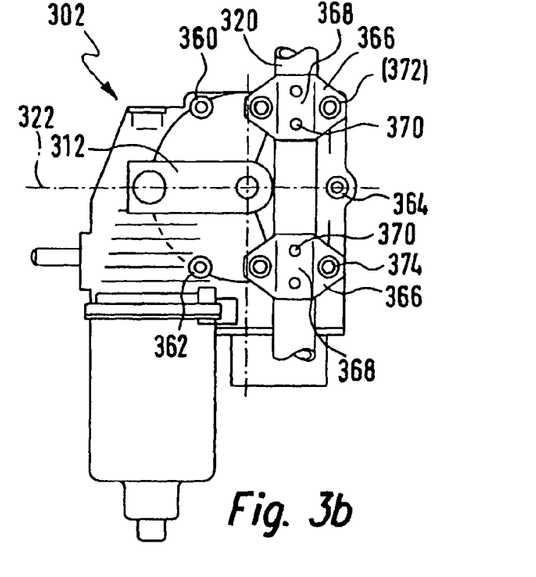

FIG. 3b shows the wiper drive 302, in the tube receiving area 318 of which a tubular element 320 is placed. Two retaining elements 366 are arranged on the tubular element 320, said retaining elements each having a tube retaining section 368 in the centre. The retaining elements 366 are non-releasably connected to the tubular element 320 via spot welds 370. The retaining elements 366 have through-holes 372 on either side of the tube retaining sections 368, said through-holes being passed through by screws 374 which are fixed in the threaded sockets 316 shown in FIG. 3a.

Figure 3C:
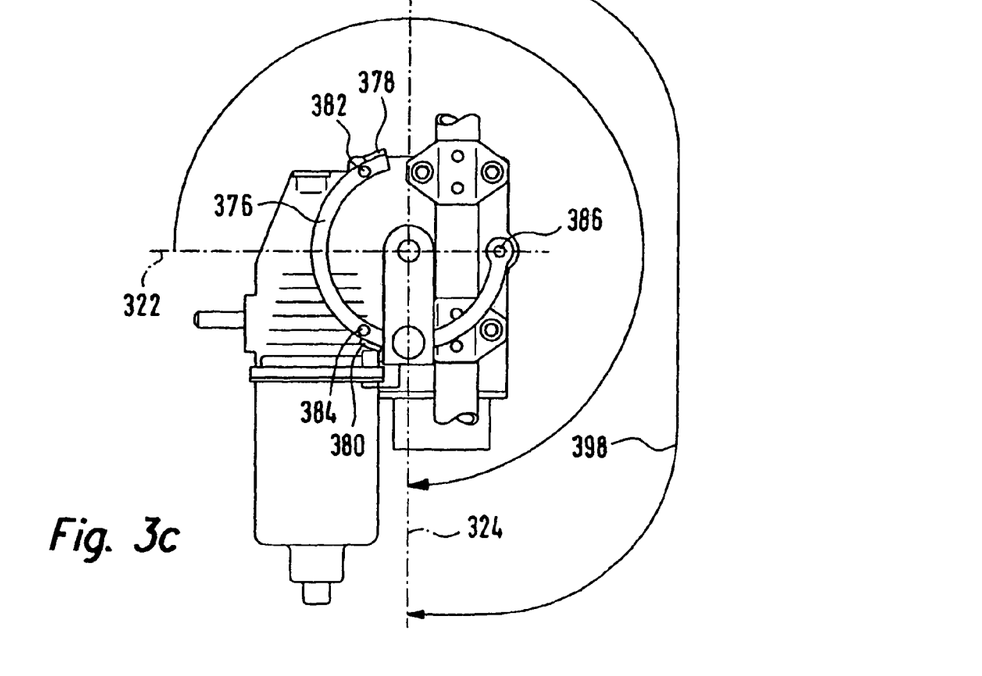

In FIG. 3c, the swaying element 312 is shown pivoted by 270° with respect to the position 322 shown in FIG. 3b, into the position 324. As shown in FIG. 3c, an add-on element 376 is provided which is designed essentially as an arc of a circle and extends over approximately 240°. The add-on element 376 bears a first stop 378 at one of its free ends, and a second stop 380 at an angular spacing of approximately 120° from the first stop 378. The add-on element 376 is secured by means of three fixing elements 382, 384 and 386 at the fixing points 360, 362 and 364 shown in FIG. 3a. The stops 378 and 380 delimit a pivoting range 398 which extends over approximately 180°.

The following steps are required in order to mount the wiper drive 302 shown in FIGS. 3a-c. Firstly, the retaining elements 366 are fixed to the tubular element 320 via the welded connection 370. In the following step, the assembly consisting of tubular element 320 and retaining elements 366 is supplied to the wiper drive 302 and secured there by means of screws 374. In the next step, the swaying element 312 is pivoted by approximately 270°, out of the first swaying position 322 and into the second swaying position 324. In the final mounting step, the add-on element 376 is fixed by means of the fixing elements 382 to 386 at the fixing points 360 to 364.

Figure 4A:
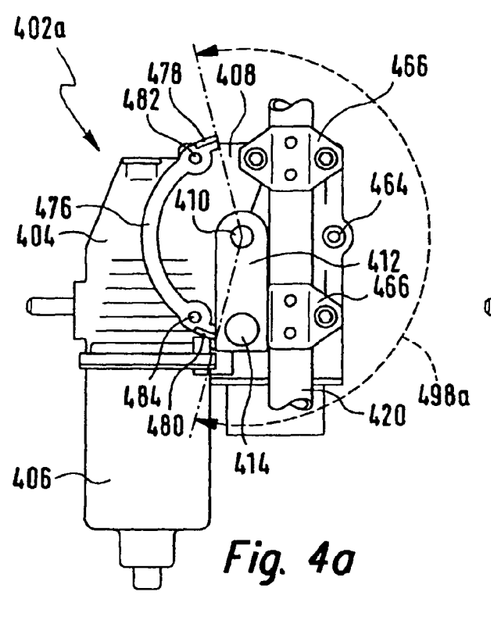
FIGS. 4a-c: show a modification of the embodiment shown in FIGS. 3a-c.

FIGS. 4a-c show three modifications compared to the embodiment shown in FIGS. 3a-c. The add-on element 476 used in the variant of FIG. 4a does not extend over an angle of approximately 240° like the add-on element 376 used in FIG. 3c, but rather only over an angle of approximately 120°. The add-on element 476 shown in FIG. 4a has a stop 478 and 480 at each of its ends. The add-on element 476 is fixed to the housing 404 of the wiper drive 402a by means of two fixing elements 482 and 484. The fixing point 464 of the wiper drive 402a is not used in the variant shown in FIG. 4a. The stops 478 and 480 delimit a pivoting range 498a of the swaying element 412, said pivoting range extending over approximately 240°.

Figure 4B:
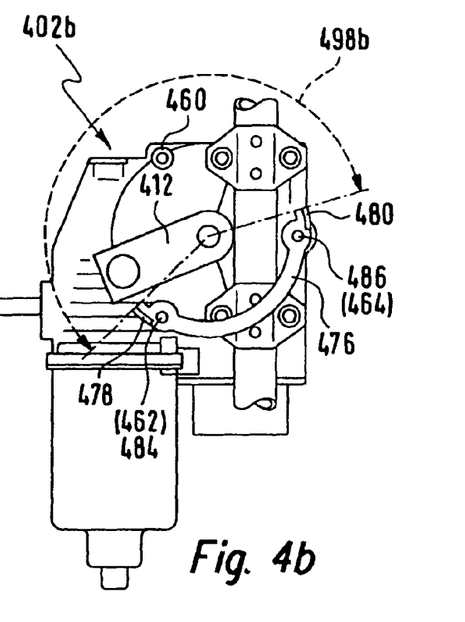

In the variant shown in FIG. 4b, the same add-on element 476 is used as in the wiper drive 402a of FIG. 4a. The add-on element 476 used in FIG. 4b is fixed at the fixing points 462 and 464 (which are hidden in the figure) by means of two fixing elements 484 and 486. The stops 478 and 480 formed at the ends of the add-on element 476 delimit a pivoting range 498b which extends essentially over 240° and is offset by approximately 120° in the clockwise direction compared to the pivoting range 498a shown in FIG. 4a.

Figure 4C:
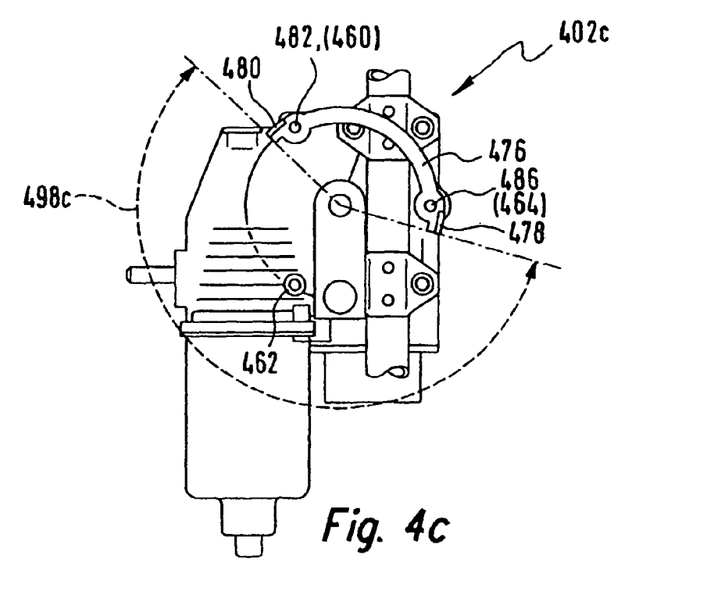

The add-on element 476 shown in FIG. 4c is fixed by fixing elements 482 and 486 at the fixing points 460 and 464. The add-on element 476 delimits with its stops 478 and 480 a pivoting range 498c which extends essentially over 240° and is offset by approximately 120° in the clockwise direction compared to the pivoting range 498b shown in FIG. 4b.

Figure 5A:
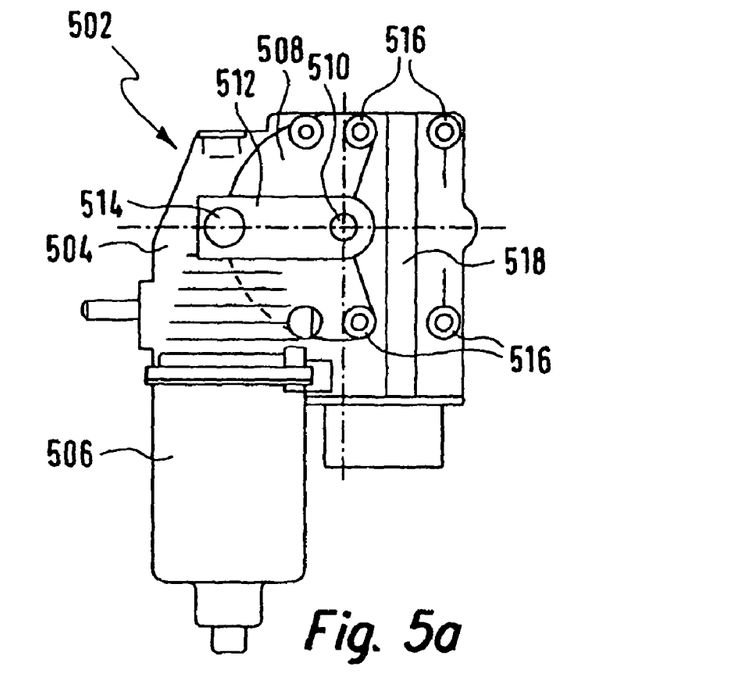
FIGS. 5a-d: show a wiper drive with a stop provided separately.
Figure 5B:
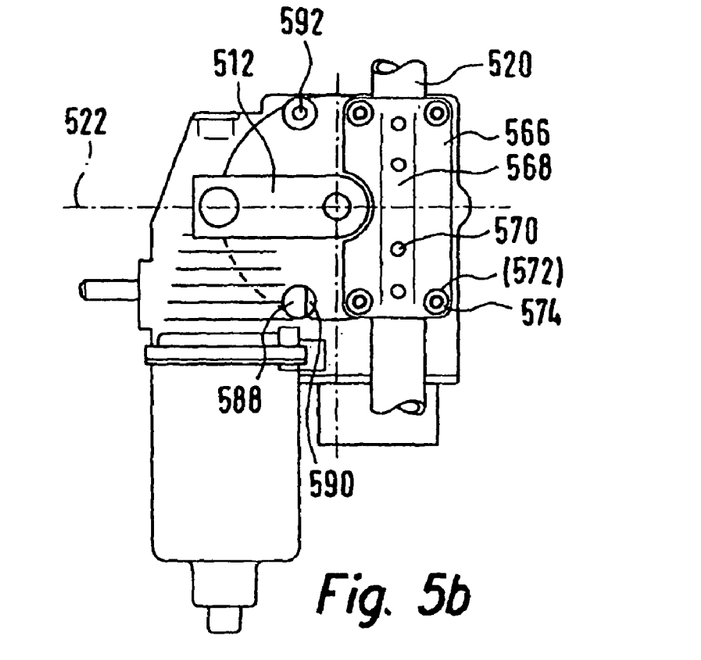

The embodiment of a wiper drive 502 shown in FIG. 5a corresponds to the wiper drive 2 shown in FIG. 1a. As shown in FIG. 5b, placed in the tube receiving area 518 of the wiper drive 502 is a tubular element 520 which is provided with a retaining element 566 which has a centrally arranged tube retaining section 568 which is connected to the tubular element 520 via spot welds 570. The retaining element 566 has through-holes 572 which are passed through by screws 574 which are fixed in the threaded sockets 516 shown in FIG. 5a. The housing 504 of the wiper drive 502 has a stop 588 which is formed in one piece with the housing 504 and in which a step 590 is provided, said step facing the tubular element 520.

Figure 5C:
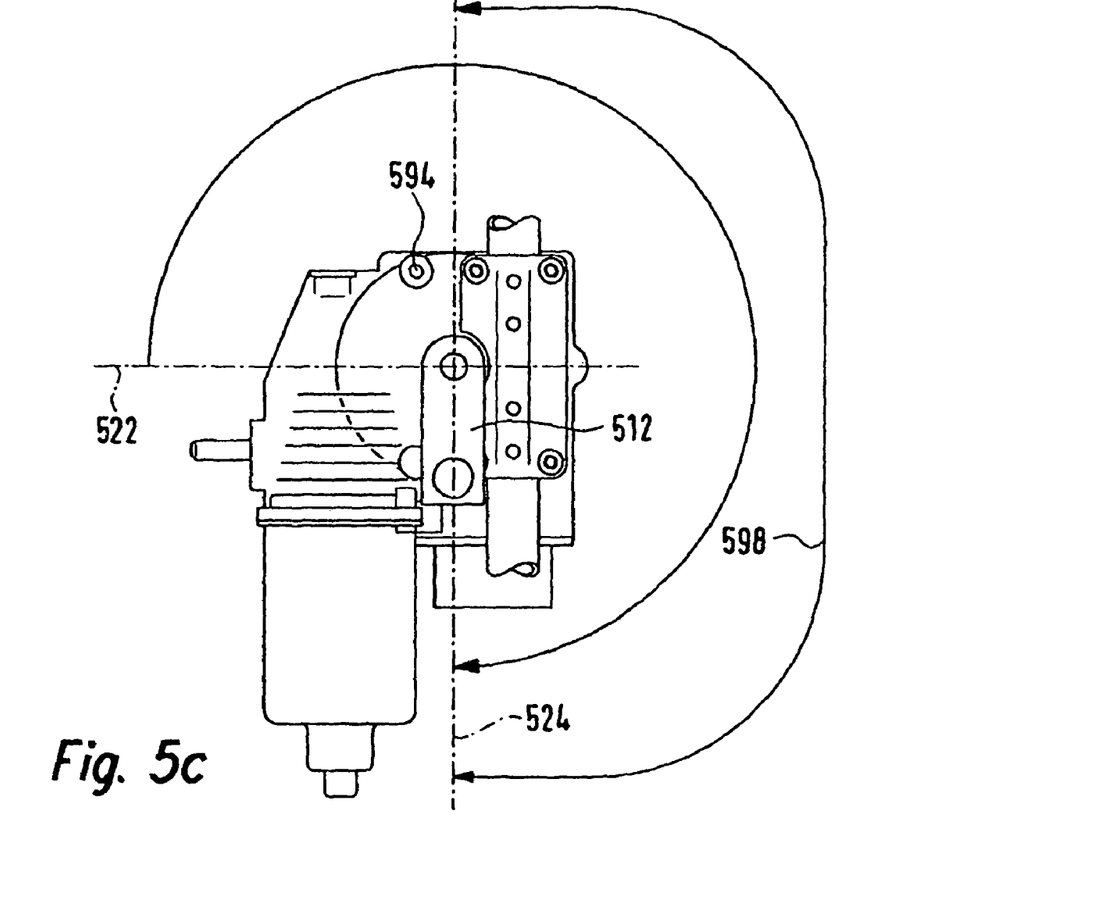
Figure 5D:
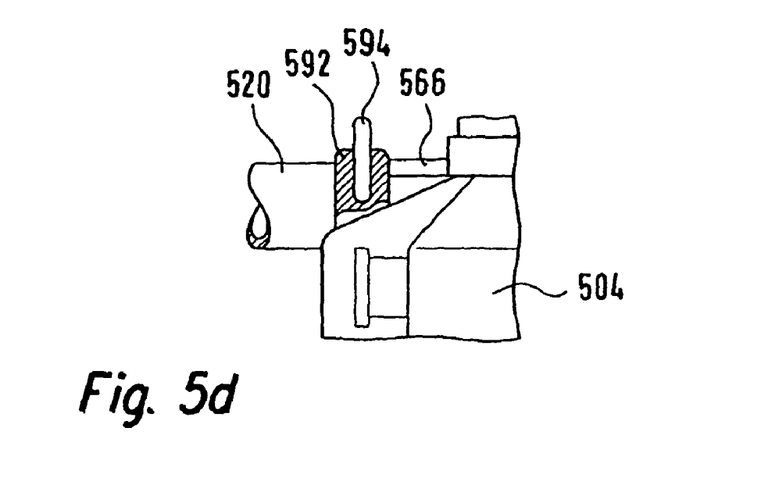

The housing 504 furthermore has a pin holder 592. As shown in FIGS. 5c and 5d, a pin 594 is inserted in the latter, said pin serving as a second stop. The pin 594 extends essentially perpendicular to the plane of pivoting of the swaying element 512.

The following steps are required in order to mount the embodiment of the wiper drive 502 shown in FIGS. 5a-d. Firstly, the retaining element 566 is connected to the tubular element 520 via a spot weld. The tubular element 520 together with the retaining element 566 is then supplied to the wiper drive 502 and the tubular element 520 is inserted in the tube receiving area 518 in the housing 504 of the wiper drive 502. In the next step, the retaining element 566 is fixed to the housing 504 by means of screws 574. The swaying element 512 is then pivoted by approximately 270°, out of a first swaying position 522 and into a second swaying position 524 (cf. FIGS. 5b and 5c). The pin 594 is then placed in the pin holder 592 so that a pivoting range 598 of the swaying element 512 is delimited by the stepped stop 588 and the pin 594.

Figure 6A:
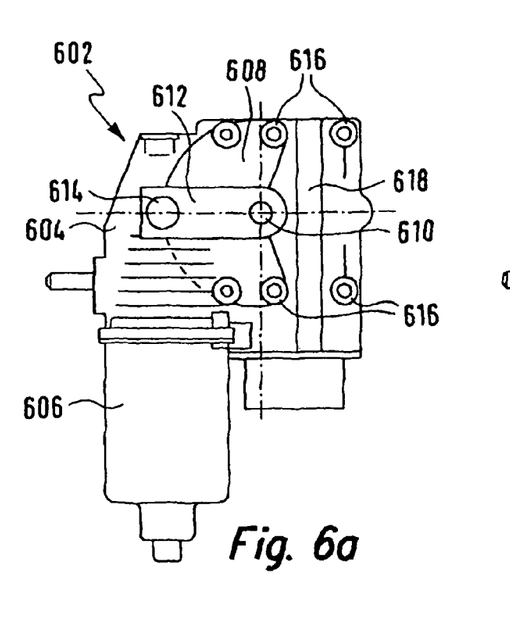
FIGS. 6a-c: show a wiper drive with two stops provided separately.
Figure 6B:
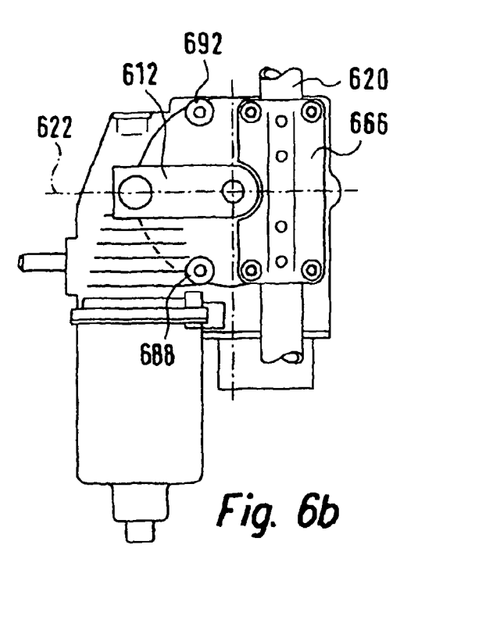
Figure 6C:
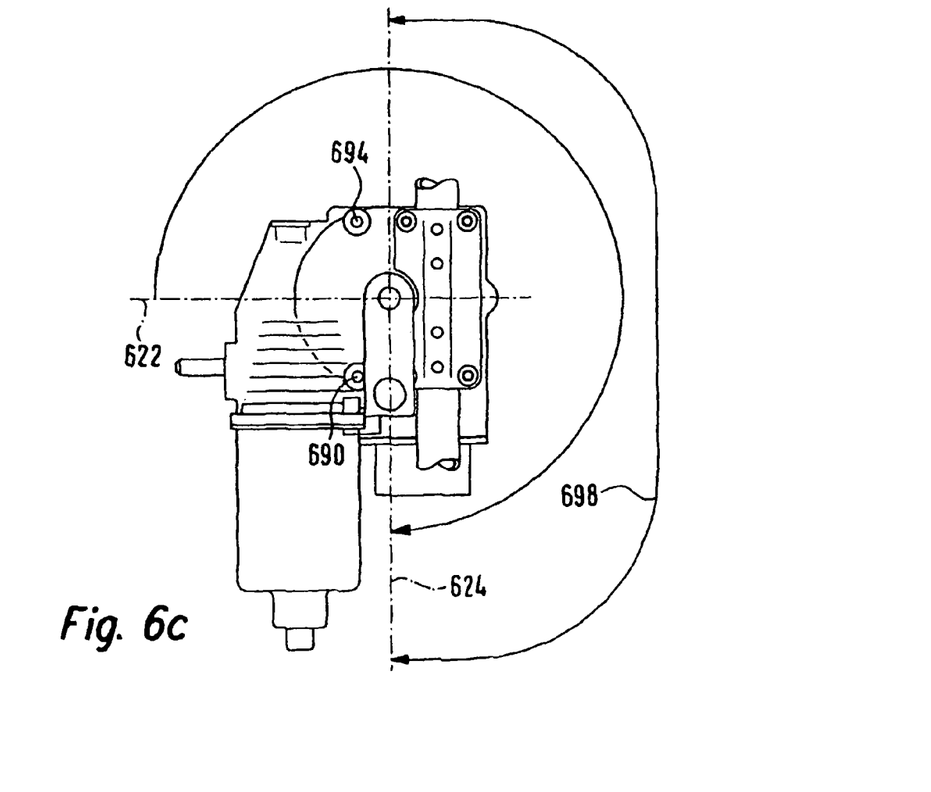

The embodiment of a wiper drive 602 shown in FIGS. 6a-c corresponds largely to the embodiment shown in FIGS. 5a-d. Instead of a stop connected in one piece with the housing, however, as shown in FIG. 6b a total of two stop holders 688 and 692 are provided, in which two pins 690 and 694 are placed, as shown in FIG. 6c, said pins in each case serving as stops. The pins 690 and 694 are received in the respective holders 688 and 692, as has already been described with reference to FIG. 5d.

The following steps are required in order to mount the embodiment of the wiper drive 602 shown in FIGS. 6a-c. Firstly, the tubular element 620 is connected to the retaining element 666 via a spot weld. The two components are then supplied as an assembly to the wiper drive 602, and the tubular element 620 is inserted in the tube receiving area 618. The retaining element 666 is then fixed to the housing 604 by means of screws. In the next step, the swaying element 612 is pivoted by approximately 270°, out of the swaying position 622 shown in FIG. 6b and into the swaying position 624 shown in FIG. 6c. Finally, the pins 690 and 694 are inserted in the holders 688 and 692. A pivoting range 698 is now delimited by the pins 690 and 694, said pivoting range extending over approximately 180°.

Figure 7A:
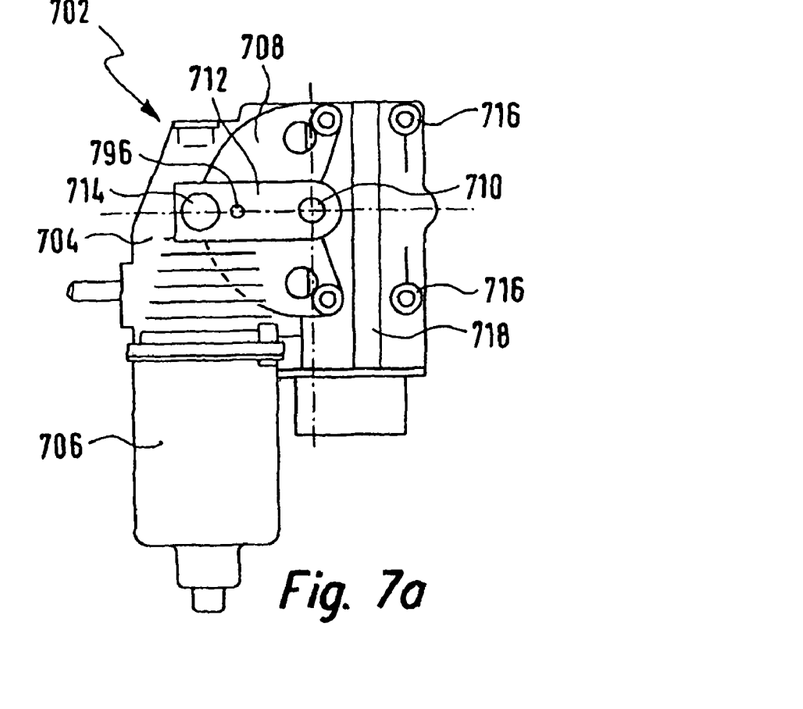
FIGS. 7a-d show a wiper drive with a stop element which is slidably mounted in a swaying element.
Figure 7B:
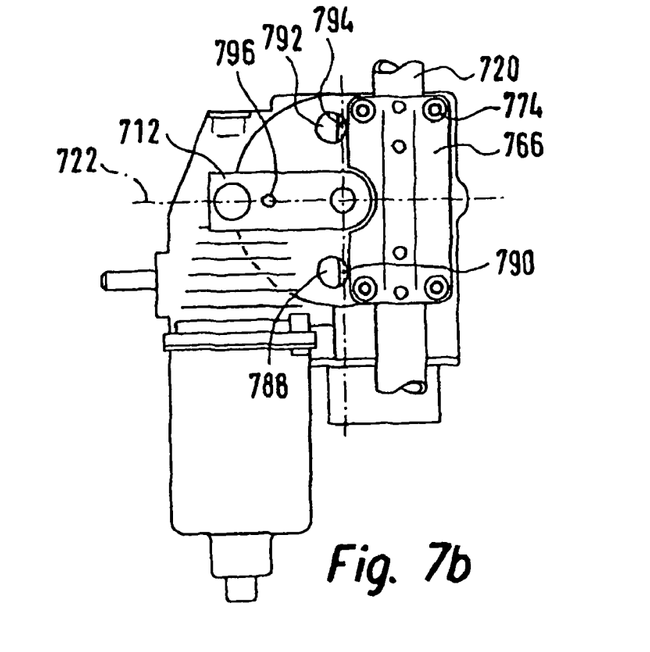

FIGS. 7a-d show another embodiment of the invention. The wiper drive shown in FIG. 7a corresponds to the wiper drive 2 shown in FIG. 1a. In FIG. 7b, a tubular element 720 is connected to a retaining element 766 via a spot weld, said retaining element in turn being connected to the housing 704 of the wiper drive 702 by means of screws 774. The housing 704 has two stops 788 and 792, which each have a step 790 and 794.

Figure 7C:
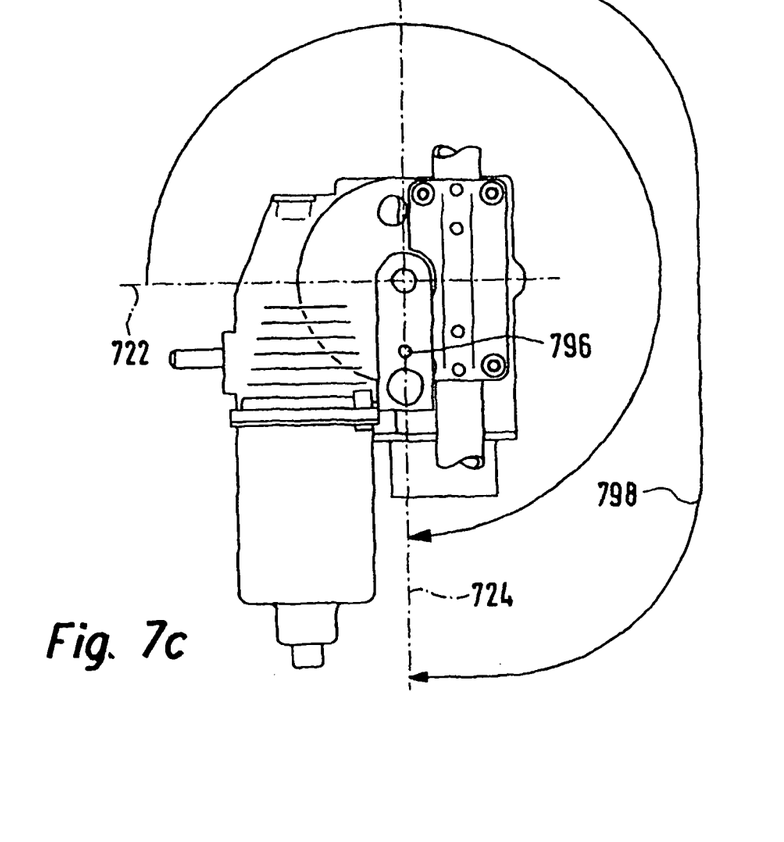
Figure 7D:
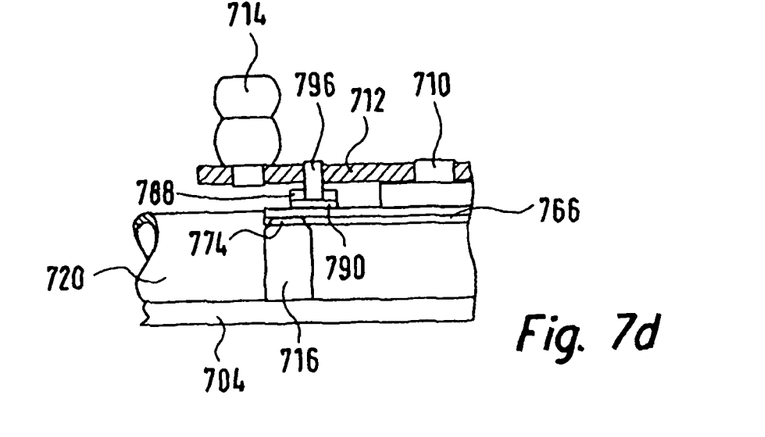

A stop element designed as a pin 796 is provided in the swaying element 712, said stop element being displaceably mounted in the swaying element 712. This is shown in detail in FIG. 7d. In FIG. 7d, the housing 704 of the wiper drive 702 can be seen, which housing comprises the threaded socket 716. Arranged next to the threaded socket 716 shown in FIG. 7d is the tubular element 720 which is fixed to the housing 704 via the retaining element 766 and screws 774. The swaying element 712 shown at the top in FIG. 7d has a hinge pin 714 at its end, which hinge pin serves to drive a wiper arm or wiper arm rod (not shown). At the end of the swaying element 712 opposite the hinge pin 714, said swaying element is connected to the gear mechanism output shaft 710 via a press connection.

Between the gear mechanism output shaft 710 and the hinge pin 714, the swaying element bears the pin 796 which is displaceably mounted in the swaying element 712. In the position shown in FIG. 7*d*, the pin 796 cooperates with the step 790 of the stop 788 so that the pivoting range of the swaying element 712 is delimited by the stop 788 and by the stop 792. Overall, the swaying element 712 can assume positions which lie within the pivoting range 798 (cf. FIG. 7*c*).

The following steps are required in order to mount the wiper drive 702 shown in FIGS. 7*a-d*. Firstly, the retaining element 766 is connected to the tubular element 720 via a spot weld. The assembly thus formed is then supplied to the wiper drive 702 and fixed there to the housing 704 via screws 774. In the next step, the swaying element 712 is brought out of the swaying position 722 shown in FIG. 7*b* and into the swaying position 724 shown in FIG. 7*c*. The stop element 796 designed as a pin is then displaced in the direction of the housing 704, so that the pin 796 can cooperate with the steps 790 and 794 of the stops 788 and 792.

All the embodiments described have the common feature that the wiper drive can be mounted with few steps and very simple and cost-effective mounting elements can be used.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A wiper drive comprising a housing mounted on a support frame, a reversing motor and a gear mechanism connected downstream of said reversing motor, wherein a swaying element for driving at least one wiper arm or a wiper arm rod is provided on a gear mechanism output shaft, and wherein an operating range of said swaying element lies within a pivoting range which is delimited by a plurality of mechanical stops, wherein at least one stop is undetachably arranged as a unitary one-piece construction with at least one add-on element that is detachably mounted to the housing via attachment means such that it can be removed and/or moved in such a way that said swaying element can be moved from a first mounting position, which lies outside said pivoting range, into said pivoting range without being obstructed by said at least one stop, wherein when said swaying element is in said first mounting position it is outside said pivoting range, but is driven into said pivoting range after which said at least one stop may be mounted on said housing to delimit movement of said swaying element from within said pivoting range to outside of said pivoting range:

wherein said support frame comprises a tubular element and said at least one add-on element comprises a tube retaining section, said tubular element being secured within said housing by said tube retaining section of said at least one add-on element.

2. The wiper drive according to claim 1, wherein said at least one add-on element is fixed on said at, at least one, fixing point.

3. The wiper drive according to claim 1, wherein said at least one add-on element is designed as a shaped part made of sheet metal.

4. The wiper drive according to claim 1, wherein said plurality of stops comprises two stops.

5. The wiper drive according to claim 1, wherein said tube retaining section comprises an arcuate portion for engaging said tubular element.

6. The wiper drive according to claim 1, wherein said swaying element is non-releasably connected to said gear mechanism output shaft.

7. A wiper drive comprising a housing mounted on a support frame, a reversing motor and a gear mechanism connected downstream of said reversing motor, wherein a swaying element for driving at least one wiper arm or a wiper arm rod is provided on a gear mechanism output shaft, and wherein an operating range of said swaying element lies within a pivoting range which is delimited by a plurality of mechanical stops, wherein at least one stop is undetachably arranged as a unitary one-piece construction with at least one add-on element that is detachably mounted to the housing via attachment means such that it can be removed and/or moved in such a way that said swaying element can be moved from a first mounting position, which lies outside said pivoting range, into said pivoting range without being obstructed by said at least one stop, wherein when said swaying element is in said first mounting position it is outside said pivoting range, but is driven into said pivoting range after which said at least one stop may be mounted on said housing to delimit movement of said swaying element from within said pivoting range to outside of said pivoting range;

wherein said support frame comprises a tubular element and said at least one add-on element comprises a tube retaining section, said tubular element being secured by clamping between the housing and said tube retaining section of said at least one add-on element.

* * * * *